United States Patent [19]

Huang

[11] Patent Number: 5,000,847
[45] Date of Patent: Mar. 19, 1991

[54] OIL FILTER CONSTRUCTION FOR HAND SPINNING

[76] Inventor: Andrew B. Huang, 28442 Lomo Dr., Rancho Palos Verdes, Calif. 90274

[21] Appl. No.: 402,083

[22] Filed: Sep. 1, 1989

[51] Int. Cl.⁵ .............................................. B01D 27/08
[52] U.S. Cl. .................................. 210/238; 210/444; 210/DIG. 17
[58] Field of Search ............... 210/238, 443, 444, 470, 210/471, DIG. 17, 232, 237, 251, 455; 123/196 A; 184/1.5, 6.24

[56] References Cited

U.S. PATENT DOCUMENTS

| | | | |
|---|---|---|---|
| 2,471,069 | 5/1949 | Le Clair | 210/444 |
| 2,801,751 | 8/1957 | Thomas | 210/444 |
| 3,279,609 | 10/1966 | Francois | 210/DIG. 17 |
| 3,473,666 | 10/1969 | Humbert | 210/443 |
| 3,722,691 | 3/1973 | Francois | 210/DIG. 17 |
| 4,364,829 | 12/1982 | Atkins et al. | 210/238 |
| 4,416,776 | 11/1983 | Brundidge | 210/DIG. 17 |
| 4,741,305 | 5/1988 | Moon | 210/444 |
| 4,871,455 | 10/1989 | Terhune et al. | 210/DIG. 17 |

*Primary Examiner*—Robert A. Dawson
*Assistant Examiner*—Matthew O. Savage
*Attorney, Agent, or Firm*—Newport Law Offices

[57] ABSTRACT

A spin-on type oil filter with an improvement to the normal filter body that allows non-tool assisted, easy hand installation and removal of the filter unit in open and close tolerance situations.

5 Claims, 2 Drawing Sheets

OIL FILTER CONSTRUCTION FOR HAND SPINNING

BACKGROUND OF THE INVENTION

The majority of today's oil filters is the spin-on variety which has a centrally embedded female threaded portion that complements a male threaded portion on the engine mounting plate, in a recognized manner. Installation and removal of the oil filter unit is accomplished by rotating the filter body in the clockwise and counter-clockwise direction, respectively. Most present day oil filter housings are also constructed with axially aligned grooves around the closed end of the body, for the purpose of facilitating hand installation and removal. Hand spinning of the oil filter unit is achieved by grasping the filter body with the fingers and turning with the hand.

In theory, the use of hand in all phases of oil filter change is possible. In practice, this method is virtually impossible. A large, oil free hand with great finger and hand strength is required for hand spinning. Great strength is needed, in particular, during removal when the filter housing often sticks to the engine mounting plate. Also the filter unit is often too large to be easily grasped by small hands. Furthermore, keeping the hands oil free during all phases of filter change is difficult. These are practical reasons why present day oil filters can not easily be mounted nor dismounted by hand.

To circumvent the above problems in hand spinning, filter wrenches of various types have been devised. In addition to wrenches, new oil filter housings with accompanying tools have likewise been proposed to solve these problems. In reference to U.S. Pat. Ser. Nos. 4,364,829; 3,722,691; 3,473,666 and 3,279,609, there exist numerous inventions in filter constructions to facilitate oil filter installation and removal. All of the above cited inventions however require the use of external tools in conjunction to the proposed filter body construction.

There are numerous limitations in the use of filter wrenches and other tools. The use of these tools recently has been complicated by the automotive industry designers installing the oil filters in either virtually inaccessible areas, or close tolerance locations. This is particularly true in the case of most front wheel drive vehicles manufactured both here and abroad. The use of the filter wrenches and tools, under these circumstances, is usually met with poor performance, and often times results in damaged filters. Even when filters are located in accessible locations, frequently a given tool can only be used on a selected few types of filters. Most multiple automobile owners are required to purchase multiple oil filter tools.

An attempt to solve the close tolerance oil filter change problem was devised in U.S. Pat. No. 4,416,776. This invention proposed using two strips of material counter wrapped around the filter cylinder body. By pulling the appropriate tape, the filter body will spin on and off. This approach is only feasible provided sufficient torque can be generated and ample room exists for pulling the tapes.

None of the references teach the new and novel use in combination of elements in the environment set forth hereinafter and defined as turning device and construction for oil filter. Neither do they provide the benefits and advantages associated therewith the following proposed embodiment. Whereas the previous invention all have limited applications, as will become obvious from the figures and detailed description below, the proposed invention will have broad applications. The hereinafter embodiment allows hand installation and removal of oil filters in all hand accessible situations, while requiring neither great finger and hand strength nor oil free hands.

SUMMARY AND OBJECTIVES OF THE INVENTION

An object of this invention is to provide a means of hand spinning-on and spinning-off a threaded oil filter in open tolerance situations.

A further object of this invention is to provide a means of hand spinning-on and spinning-off a threaded oil filter in close tolerance situations.

Another object of the present invention is to provide means which can easily be incorporate into the fabrication of oil filter housing to facilitate the hand installation and removal therefore.

Still another object of the present invention is to provide means which can easily be adapted to any existing oil filter housing to facilitate the hand installation and removal therefore.

An additional object of the present invention is to obviate the need for filter wrenches in installing and removing oil filter.

A still additional object of the present invention is to provide an improvement which allows changing oil filters without the need for separation or additional tools.

Yet another object of the present invention is to provide an oil filter construction or attachment that perform the above said functions with minimal change in oil filter body dimensions, thus allowing use of oil filter wrenches if desired.

These and other objects, advantages and novel features of the invention will become apparent from the detailed description which follows, when considered in conjunction with the accompanying drawings.

DETAILED DESCRIPTION OF THE PREFERRED EMBODIMENT

Figure 1:
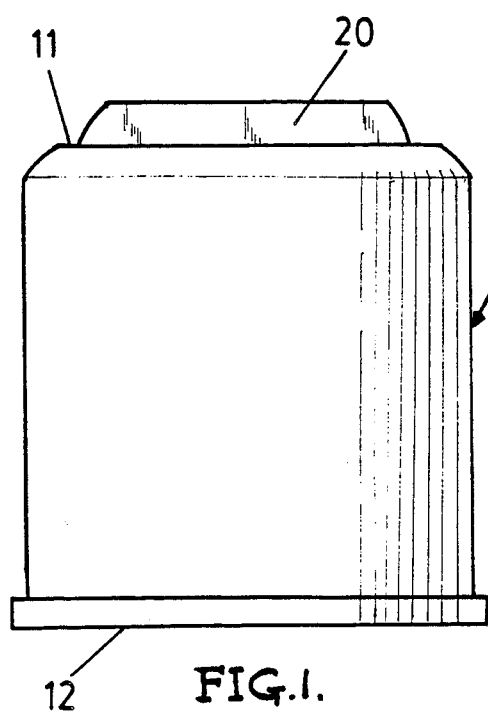
FIG. 1 is a side view of one form of the preferred embodiment.

FIG. 1 shows a standard elongated cylindrical oil filter housing, which is designated generally as 10. The typical oil filter container consists of a closed top 11 and an open bottom 12. The threaded aperture, which is dimensioned to mate with a complementing threaded member on the engine housing, in a well known manner, is located at the open bottom 12.

Figure 2:
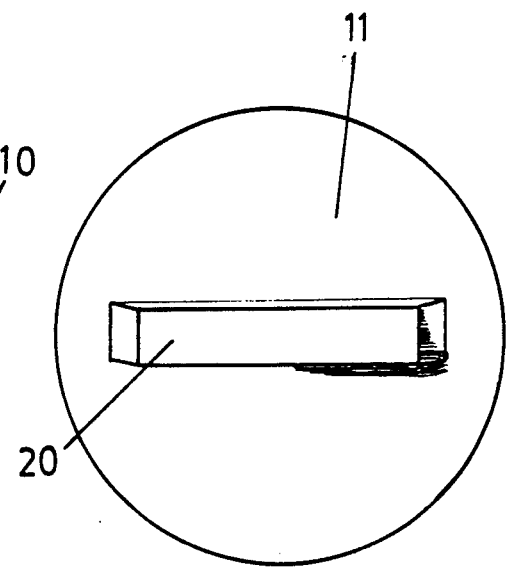
FIG. 2 is a top view of the preferred embodiment shown in FIG. 1.

FIG. 1 and FIG. 2 teach an embodiment of the device. In reference to FIG. 1 and FIG. 2, it can be seen that the external closed end of the oil filter housing 11 is provided with a centrally fixed rib 20, or a plurality of centrally fixed ribs. The rib 20 serves as a handle. When turned, the rib 20 will impart a rotary motion to the oil filter unit. The rib 20 is formed such that afforded for the turning of the oil filter body by the twisting of the thumb in the counter direction to the fingers against such said device, by the twisting of the thumb in the counter direction to the index finger against such said device, or locking the thumb and the index finger about such said device and turning with the hand. To engage or disengage the oil filter body requires the clock-wise or counter-clock-wise rotation against the same said device using either one or all of the above mentioned motions.

The rib 20, in the preferred embodiment, is formed during the oil filter housing as a pressed out portion of the closed end of the cylinder. Alternatively, the rib 20 can be a rigid body attached to the closed end of completed oil filter housing. As a rigid body attachment, rib 20 is secured to the filter body through welds, screws or the use of high temperature epoxy adhesives. While these methods are mentioned, it is to be understood that other attachment methods are possible.

The primary considerations in the form of the rib 20 as a rigid attached device are strength, dimension and attachability with the filter housing material. The rib 20 must be secured and rigid enough to be twisted without deforming and in term impart a rotary motion to the filter body. The height of the rib 20 must provide ample surface to ensure non-slipperage of the thumb and fingers when rotating. The width and length of the said device must provide ample leverage to generate the required torque for rotating the filter unit.

Figure 3:
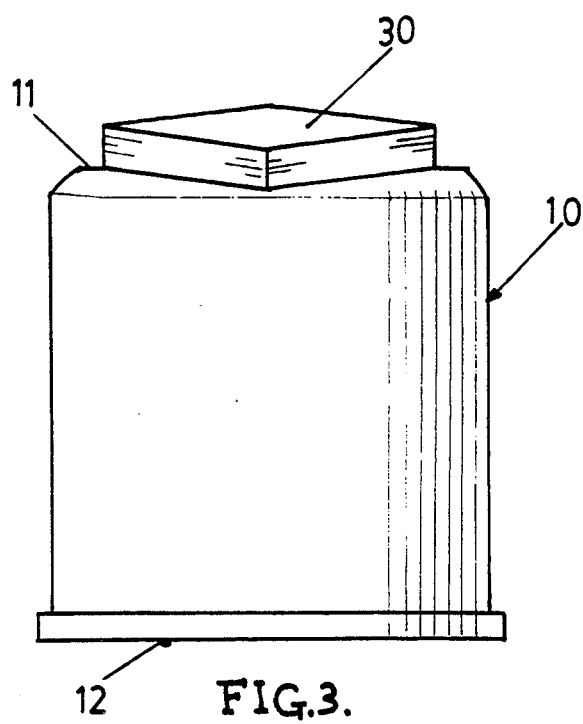
FIG. 3 is a side view of a second form of the preferred embodiment.
Figure 4:
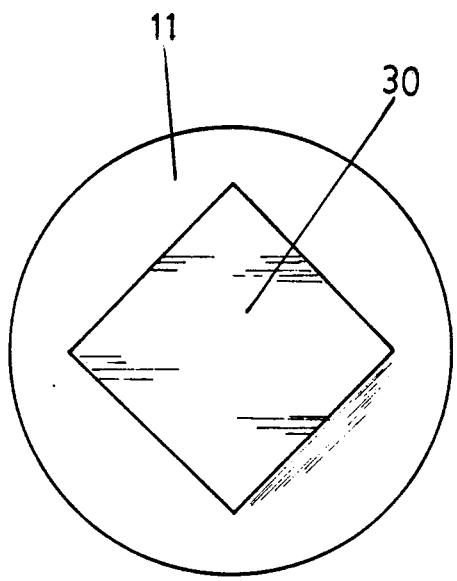
FIG. 4 is a top view of the preferred embodiment shown in FIG. 3.

FIG. 3 and FIG. 4 teach another embodiment of the device. In reference to FIG. 3 and FIG. 4, it can be seen that the external closed end of the oil filter container 11 is provided with a centrally fixed cam 30. The cam 30 could have a multiplicity of sides other than four. The cam 30 serves as a handle. When turned the cam 30 will impart a rotary motion to the oil filter unit. The cam 30 is formed such that afforded for the turning of the oil filter body by the twisting of the thumb in the counter direction to the fingers against such said device, by the twisting of the thumb in the counter direction to the index finger against such said device, or locking the thumb and index finger about such said device and turning with the hand. To engage or disengage the oil filter body requires the clock-wise or counter-clock-wise rotation against the same said device using either one or all of the above mentioned motions.

The cam 30, in the preferred embodiment, is formed during the oil filter housing as a pressed out portion of the closed end of the cylinder. Alternatively, the cam 30 can be a rigid body attached to the closed end of completed oil filter body. As a rigid body attachment, cam 30 is secured to the filter body through welds, screws or the use of high temperature epoxy adhesives. While these methods are mentioned, it is to be understood that other attachment methods are possible.

The primary considerations in the form of the cam 30 as a rigid attached device are strength, dimension and attachability with the filter housing material. The cam 30 must be secured and rigid enough to be twisted without deforming and in term impart a rotary motion to the filter body. The height of the cam 30 must provide ample surface to ensure non-slipperage of the thumb and fingers when rotating. The width and length of the said device must provide ample leverage to generate the required torque for rotating the filter body.

Figure 5:
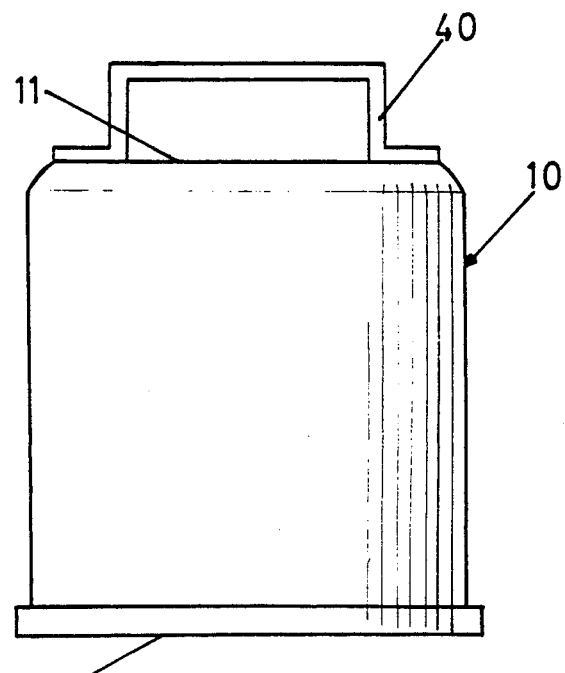
FIG. 5 is a side view of a third form of the preferred embodiment.
Figure 6:
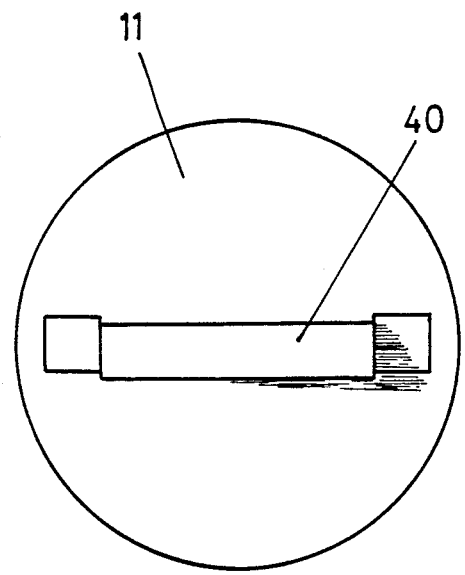
FIG. 6 is a top view of the preferred embodiment shown in FIG. 5.

FIG. 5 and FIG. 6 teach a third embodiment of the device. In reference to FIG. 5 and FIG. 6, it can be seen that the external closed end of the oil filter container 11 is provided with a centrally fixed bail 40. The bail 40 serves as a handle. When turned the bail 40 will impart a rotary motion to the filter unit. The bail 40, an attached rigid device, is sufficiently wide and high to allow the insertion of fingers. The bail 40 is formed strong enough such that afforded for the turning of the oil filter housing by the insertion of fingers into the bail 40 accompanied by the turning of the hand. To engage or disengage the oil filter body requires the clock-wise or counter-clock-wise repeat of the insertion and turning motions.

As a rigid body attachment, the bail 40 is secured to the filter body through welds, screws or the use of high temperature epoxy adhesives. While these methods are mentioned, it is to be understood that other attachment methods are possible.

The primary considerations in the form of the bail 40 as a rigid attached device are strength, dimension and attachability with the filter housing material. The bail 40 must be secured and rigid enough to be twisted without deforming and in term impart a rotary motion to the filter body. The height and length of the bail 40 must provide ample room for the insertion of fingers.

What is claimed is:

1. A spin-on, spin-off type oil filter arrangement for installation and removal from a vehicle engine by hand, comprising:
   a spin-on type oil filter having an elongated cylindrically shaped housing body having a closed top portion at one end and a threaded aperature at the other end, and
   a rib centrally fixed to and extending substantially across said closed top portion, said rib having sufficient rigidity and size to be hand manipulatable for installation or removal of the oil filter from a vehicle engine.

2. The oil filter arrangement defined in claim 1 wherein said rib has a substantially rectangular cross section.

3. A spin-on, spin-off type oil filter arrangement for installation and removal from a vehicle engine by hand, comprising:
   a spin-on type oil filter having an elongated cylindrically shaped housing body having a closed top portion at one end and a threaded aperature at the other end, and
   a rectangular block shaped member rigidly affixed to and covering a substantial extent of said closed top portion, said block shaped member having four vertical sides and being sufficiently sized so as to be hand manipulatable for installation or removal of the oil filter from a vehicle engine.

4. A spin-on, spin-off type oil filter arrangement for installation and removal from a vehicle engine by hand, comprising:
   a spin-on type oil filter having an elongated cylindrically shaped housing body having a closed top portion at one end and a threaded aperature a the other end, and
   a centrally located bail rigidly affixed to said closed top being sufficiently sized so as to be hand manipulatable for installation or removal of the oil filter from a vehicle engine.

5. The oil filter arrangement defined in claim 4 wherein said bail comprises a rectangular shaped hoop member.

* * * * *

UNITED STATES PATENT AND TRADEMARK OFFICE
CERTIFICATE OF CORRECTION

PATENT NO. : 5,000,847

DATED : March 19, 1991

INVENTOR(S) : Andrew B. Huang

It is certified that error appears in the above-identified patent and that said Letters Patent is hereby corrected as shown below:

Column 1, line 35, after "Pat." delete "Ser.".

Signed and Sealed this

Thirteenth Day of October, 1992

Attest:

DOUGLAS B. COMER

*Attesting Officer*   *Acting Commissioner of Patents and Trademarks*